UNITED STATES PATENT OFFICE.

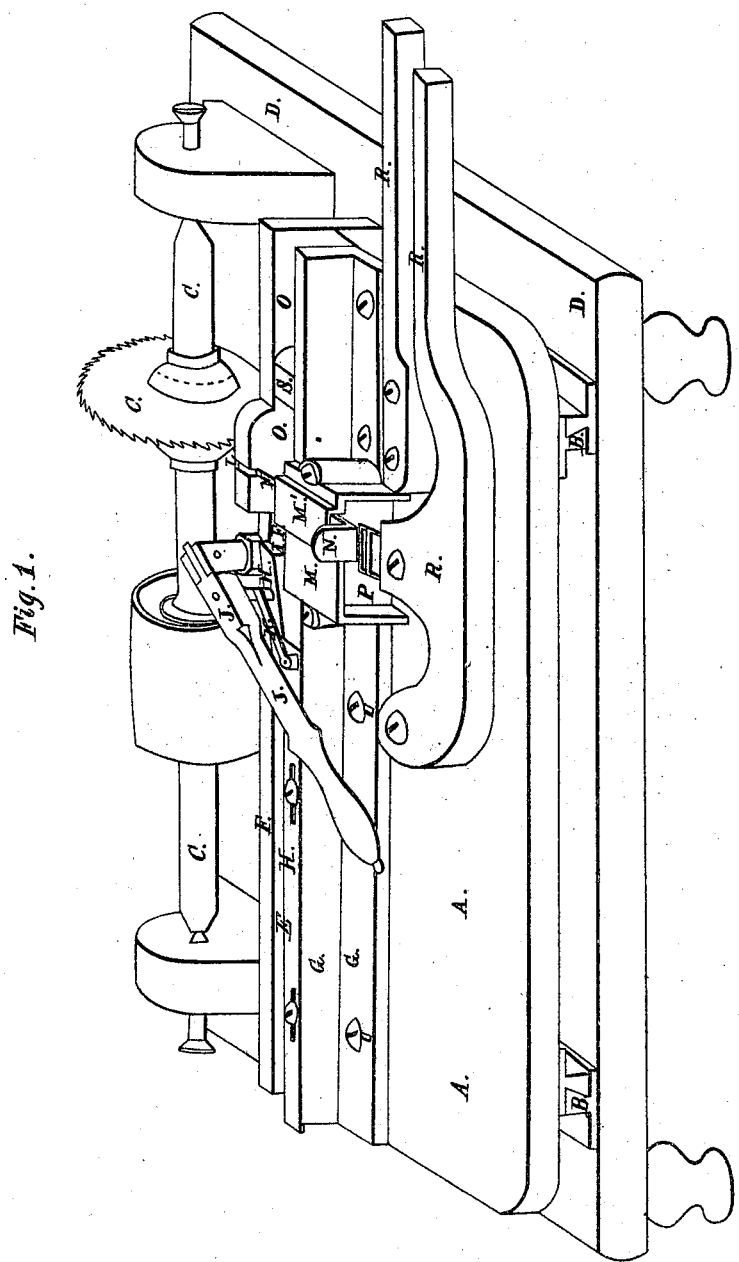

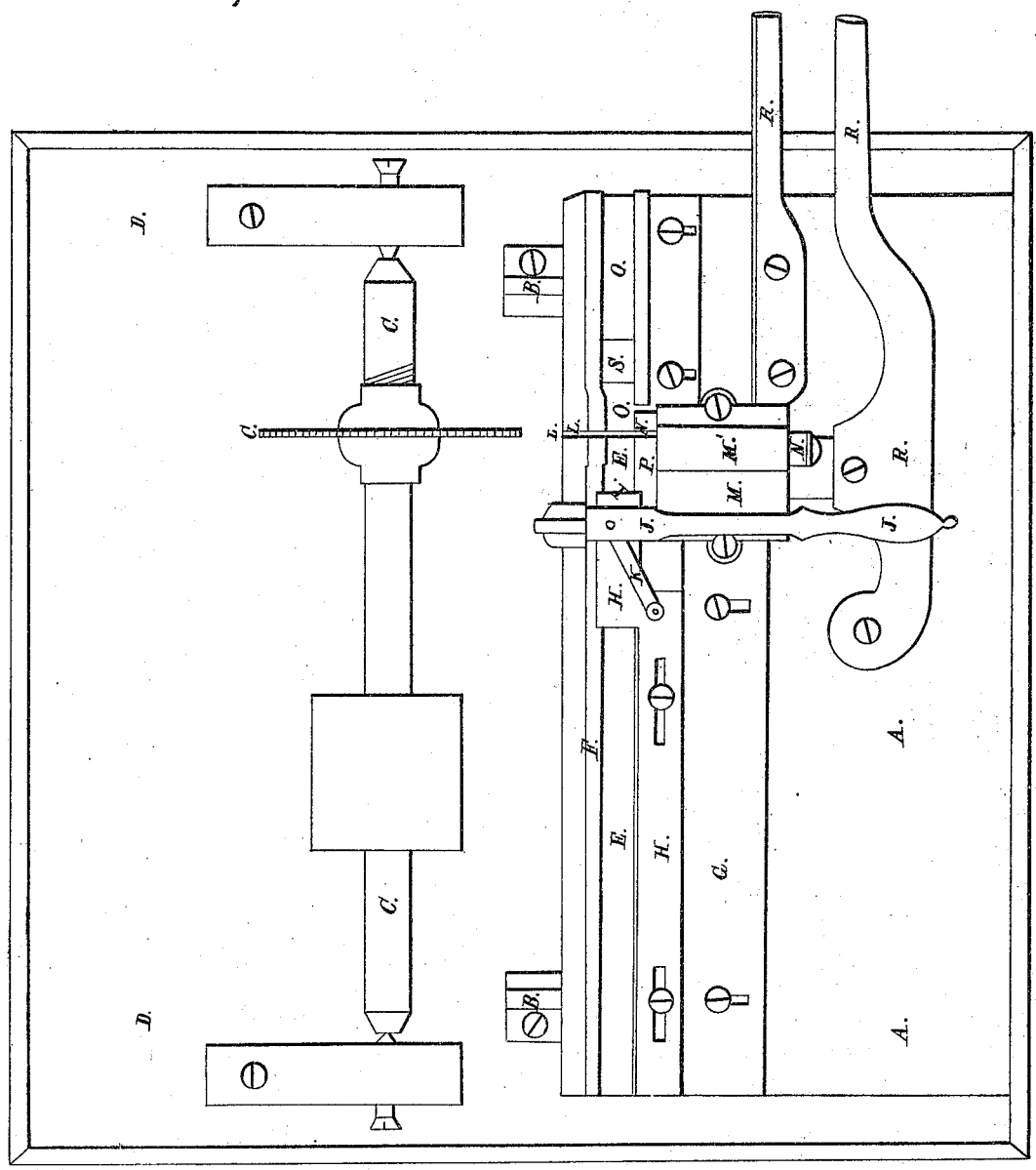

JOHN JOS. CH. SMITH, OF PHILADELPHIA, PENNSYLVANIA.

MACHINE FOR CUTTING PRINTERS' TYPES.

Specification forming part of Letters Patent No. 43,649, dated July 26, 1864.

*To all whom it may concern:*

Be it known that I, JOHN JOS. CH. SMITH, of the city of Philadelphia, and State of Pennsylvania, have invented a new and useful Machine for Cutting Printing-Type; and I do hereby declare that the following is a full, clear, and exact description of the construction and operation of the same, reference being had to the annexed drawings, making a part of this specification, in which—

Figure 1 is a perspective view of the machine; Fig. 2, a plan of the same.

My invention consists of a machine for cutting type of all sizes from strips of metal, which strips have type-heads on one edge, the type heads being separated from each other by intervening spaces sufficient to allow a saw to be passed between them without injuring their faces. The making of such strips I have described in an application for Letters Patent, which application bears even date herewith. My machine will also cut a number of type at one operation, and of such perfection that no additional work is required for finishing them.

This machine operates somewhat on the same principle as that for which I obtained Letters Patent of the United States on the 5th day of February, 1861; but it is improved so as to cut from fifteen to twenty type at every cut; and further, so that it keeps the cut type set up, ready for packing.

To enable others skilled in the art to make and use my invention, I will proceed to describe its construction and mode of operation.

The carriage or sliding table A moves in two dovetail slides, B. To this table or carriage most of the mechanism of the machine is attached. C is a circular saw on its mandrel, the bearings of which are fixed to the table D. Instead of being arranged as described, the saw might be made movable in sliding guides and the table stationary. E is a channel in depth equal to the type-body. This channel is formed by the two guide-bars F and G, of which the bar G is movable. Into this channel I put a number of the aforesaid type-strips to be cut. H is a sliding bar, one end of it being turned down to form a hook, I, and this bar moves or slides on top of the bar G, being guided and limited in its motion by screws or pins inserted through slots in the bar H into the bar G. The hook I is placed in the spaces between the type-heads by means of the lever J, (which lever is connected with the sliding bar by a pivot and small rod, K,) thus enabling the operator to move the strips together forward in the channel, so as to bring them into right position for cutting. As soon as the strips are moved so far forward as to bring the aforesaid intervening spaces (through which the saw has to pass) in a line square with the cut L in the sliding table a small bar, N, moving in the box M', (and which bar N serves as a gage,) is pushed through the spaces so far that it enters the cut L in bar F, and by so doing brings the type heads and strips into the required accurate position for being cut. Furthermore, this gage will bring the types which are cut off from the strip to the outside of the gage N, so that they stand upright and enter the channel O. This arrangement of the gage also enables the machine to cut the letters of the alphabet, which are of varying size, in alphabetical rotation, so that one strip may contain all the letters of the alphabet. As soon as this last-mentioned operation is completed the gripping-jaw P, moving in the box M, is pressed against the strips by means of the lever R, so as to keep the strips firmly together in accurate position while the saw is operating. The gage-bar N is then withdrawn and the sliding table moved against the saw to cut the type off. The type which are cut off are kept in standing position in the channel O by means of the movable block S. As soon as the strips are again moved forward in position to be cut they will press the type already cut off against the block S, thus preventing their falling down. The block S will yield to the pressure of the strips and move to the right for a distance equal to the thickness of the type which are next to be cut off. When the channel O is full of cut type, they are pushed out into a type-galley and are ready for packing up, thus saving all the labor of setting up the type for packing, which has been hitherto always required.

Having thus described my invention, what I claim, and desire to secure by Letters Patent, is—

1. The carriage A and saw B, arranged and operated substantially as above described, whereby the type-strips can be approximated to and removed from the saw at each successive cut.

2. The gripping-jaw P, to be operated by hand for holding the type securely in place during the operation of cutting, in the manner described.

3. The movable gage-bar N, for adjusting type of any size to the cutting-apparatus by gaging the type between the heads before they are cut from the strip.

4. The channel O and the sliding-block S, for receiving and supporting the type after they are cut off, so that they can be removed while set up in a composed condition.

5. The hooked feeding-bar H, arranged and operating, as described, for the purpose of feeding a series of strips of type to the cutter and at the same time holding them down to the surface of the carriage, so as to secure a square cut.

JOHN JOS. CH. SMITH.

Witnesses:
J. E. SHAW,
CHARLES B. HELFENSTEIN.